(12) United States Patent
Grießhammer et al.

(10) Patent No.: US 12,410,288 B2
(45) Date of Patent: Sep. 9, 2025

(54) HEAT-SHRINKABLE FILMS AND RELATED SYSTEMS AND METHODS

(71) Applicant: Klöckner Pentaplast of America, Inc., Gordonsville, VA (US)

(72) Inventors: Christian Grießhammer, Toeging am Inn (DE); Hongliang Zhang, Shanghai (CN)

(73) Assignee: Klöckner Pentaplast of America, Inc., Gordonsville, VA (US)

( * ) Notice: Subject to any disclaimer, the term of this patent is extended or adjusted under 35 U.S.C. 154(b) by 0 days.

(21) Appl. No.: 18/521,511

(22) Filed: Nov. 28, 2023

(65) Prior Publication Data

US 2024/0174827 A1    May 30, 2024

Related U.S. Application Data

(60) Provisional application No. 63/428,982, filed on Nov. 30, 2022.

(51) Int. Cl.
*C08J 5/18*      (2006.01)
*B29C 48/00*     (2019.01)
(Continued)

(52) U.S. Cl.
CPC .............. *C08J 5/18* (2013.01); *B29C 48/0018* (2019.02); *B29C 48/022* (2019.02); *B29C 48/08* (2019.02);
(Continued)

(58) Field of Classification Search
CPC ... B29C 48/0018; B29C 48/022; B29C 48/08; B29C 48/18; B29K 2295/0049;
(Continued)

(56) References Cited

U.S. PATENT DOCUMENTS 5,484,632 A    1/1996 Mercer, Jr. et al.
5,693,405 A    12/1997 Harvie et al.
(Continued)

FOREIGN PATENT DOCUMENTS

DE    102007018182 A1    10/2008
EP        1616695 A1     1/2008
(Continued)

OTHER PUBLICATIONS

International Search Report and Written Opinion for International Patent Application No. PCT/CN2023/072830, mailed on Jul. 3, 2023, 11 pages.

(Continued)

*Primary Examiner* — Michael C Romanowski
*Assistant Examiner* — Thomas J Kessler
(74) *Attorney, Agent, or Firm* — McBee Moore & Vanik, IP, LLC (57) ABSTRACT

In various examples, the subject matter of this disclosure relates to heat-shrinkable films and systems and methods for manufacturing and recycling heat-shrinkable films. A heat-shrinkable film can include: a first layer having a first copolymerized polyester resin; and a second layer disposed on the first layer and having a second copolymerized polyester resin, wherein the heat-shrinkable film is predisposed to either (i) curl towards the first layer when heat is applied or (ii) not curl towards the second layer when heat is applied. A layer of ink can be disposed on the second layer.

14 Claims, 5 Drawing Sheets

(51) Int. Cl.
  *B29C 48/08* (2019.01)
  *B29C 48/18* (2019.01)
  *B32B 27/08* (2006.01)
  *B32B 27/36* (2006.01)

(52) U.S. Cl.
  CPC .............. *B29C 48/18* (2019.02); *B32B 27/08* (2013.01); *B32B 27/36* (2013.01); *B29K 2995/0049* (2013.01); *B32B 2270/00* (2013.01); *B32B 2307/736* (2013.01); *B32B 2367/00* (2013.01); *B32B 2519/00* (2013.01); *C08J 2367/02* (2013.01)

(58) Field of Classification Search
  CPC ... B32B 27/08; B32B 27/36; B32B 2307/736; B32B 2367/00; B32B 2519/00; B32B 2250/03; B32B 2250/04; B32B 2250/05; B32B 7/028; C08J 5/18; C08J 2367/02
  See application file for complete search history.

(56) References Cited

U.S. PATENT DOCUMENTS

| | | | |
|---|---|---|---|
| 5,968,666 | A | 10/1999 | Carter et al. |
| 6,025,069 | A | 2/2000 | Eckart et al. |
| 6,040,061 | A | 3/2000 | Bland et al. |
| 6,068,910 | A | 5/2000 | Flynn et al. |
| 6,680,097 | B1 * | 1/2004 | Amberger ................. G09F 3/02 156/247 |
| 2002/0025444 | A1 | 2/2002 | Hebrink et al. |
| 2003/0060546 | A1 | 3/2003 | Moskala et al. |
| 2003/0152775 | A1 | 8/2003 | Gorny et al. |
| 2004/0086690 | A1 | 5/2004 | Hebrink et al. |
| 2005/0163986 | A1 | 7/2005 | Chadwick et al. |
| 2007/0298271 | A1 | 12/2007 | Liu et al. |
| 2009/0017245 | A1 | 1/2009 | Forloni |
| 2009/0208682 | A1 * | 8/2009 | Alfaro ....................... C09J 7/29 524/425 |
| 2009/0233067 | A1 * | 9/2009 | Doornheim ................ C09J 7/29 428/209 |
| 2010/0068355 | A1 | 3/2010 | Berry et al. |
| 2010/0189998 | A1 | 7/2010 | MacKerron et al. |
| 2011/0192553 | A1 | 8/2011 | Kliesch |
| 2012/0100363 | A1 * | 4/2012 | Yamamoto ............ B29C 55/023 428/319.1 |
| 2012/0328849 | A1 | 12/2012 | Neill et al. |
| 2013/0095371 | A1 * | 4/2013 | Zaikov ..................... B32B 27/08 428/354 |
| 2015/0104631 | A1 * | 4/2015 | Schrauf ................... B32B 27/36 428/480 |
| 2017/0229046 | A1 * | 8/2017 | Lang ....................... B32B 27/304 |
| 2017/0232721 | A1 | 8/2017 | Lim et al. |
| 2022/0002477 | A1 | 1/2022 | Kim |
| 2022/0389214 | A1 * | 12/2022 | Lee ....................... C08G 63/199 |

FOREIGN PATENT DOCUMENTS

| | | |
|---|---|---|
| EP | 1876019 A1 | 1/2008 |
| EP | 2298665 A1 | 3/2011 |
| JP | S61235139 A | 10/1986 |
| JP | H03020375 U | 1/1991 |
| JP | H04278330 A | 10/1992 |
| JP | 2003267437 A | 9/2003 |
| JP | 2005186460 A | 7/2005 |
| JP | 2007118494 A | 5/2007 |
| JP | 2007308164 A | 11/2007 |
| JP | 2010047006 A | 3/2010 |
| JP | 5255634 B2 | 8/2013 |
| JP | 2014515705 A | 7/2014 |
| KR | 101733186 B1 | 5/2017 |
| WO | 2013011826 A1 | 1/2013 |
| WO | 2013056011 A1 | 4/2013 |
| WO | 2020076749 A1 | 4/2020 |
| WO | 2021080779 A1 | 4/2021 |
| WO | 2022072477 A1 | 4/2022 |

OTHER PUBLICATIONS

International Search Report and Written Opinion for International Patent Application No. PCT/EP2016/079791, mailed on Feb. 10, 2017, 10 pages.

International Search Report and Written Opinion for International Patent Application No. PCT/US2021/052620, mailed on Jan. 14, 2022, 26 pages.

International Search Report and Written Opinion for International Patent Application No. PCT/US2023/081360, mailed on Feb. 26, 2024, 12 pages.

* cited by examiner

HEAT-SHRINKABLE FILMS AND RELATED SYSTEMS AND METHODS

CROSS-REFERENCE TO RELATED APPLICATIONS

This application claims the benefit of U.S. Provisional Patent Application No. 63/428,982, filed Nov. 30, 2022, entitled "Heat-Shrinkable Films and Related Systems and Methods," the entire contents of which are incorporated by reference herein.

BACKGROUND

In general, a heat-shrinkable film is a film that tends to shrink upon application of heat or when exposed to elevated temperatures. Heat-shrinkable films are used to cover and protect articles, hold articles together, label articles, and provide tamper-evident protection.

To manufacture and utilize a heat-shrinkable film, a polymeric material is prepared, extruded into a film, biaxially and/or monoaxially stretched, and formed into rolls. At a packaging facility, the film can be unrolled, printed, seamed to form a tube, and applied around an article, such as a container. The film is then heated to a shrink onset temperature so that the film shrinks to fit tightly around the container. The container can be filled with a desired product (e.g., a beverage) and sold to consumers.

After use, the container and label can be subjected to a recycling process in which the container and label are crushed, chopped, and/or shredded into flakes or particles. The particles can be cleaned or de-inked by exposing the particles to a hotwash process. The cleaned particles can be provided to a drying and solid-stating process in which the particles are heated to remove water, crystallize the particles, and/or increase a molecular weight of the particles. The processed particles can be reused to form new containers, new heat-shrinkable films, or other products.

SUMMARY

In general, the subject matter of this disclosure relates to heat-shrinkable films and systems and methods for manufacturing and recycling heat-shrinkable films. In one example, a heat-shrinkable film includes: a first layer having a first copolymerized polyester resin; and a second layer disposed on the first layer and having a second copolymerized polyester resin, wherein the heat-shrinkable film is predisposed to either (i) curl towards the first layer when heat is applied or (ii) not curl towards the second layer when heat is applied. A layer of ink can be disposed on the second layer.

Advantageously, compared to previous heat-shrinkable films, the heat-shrinkable films described herein can be easier to recycle. For example, when particles of the heat-shrinkable films described herein contain a layer of ink and are immersed in a hotwash process, the particles have a tendency to not curl towards the ink layer, such that the ink is exposed to hotwash materials and can be more easily removed from the particles. By contrast, particles of previous heat shrink films tend to curl towards the ink layer, such that the ink can become encapsulated or trapped within the particles, and the hotwash process may be unable to remove the ink from the particles.

In one aspect, the subject matter of this disclosure relates to a heat-shrinkable film. The heat-shrinkable film includes: a first layer including a first copolymerized polyester resin; and a second layer disposed on the first layer and including a second copolymerized polyester resin, wherein the heat-shrinkable film is predisposed to either (i) curl towards the first layer when heat is applied or (ii) not curl towards the second layer when heat is applied.

In certain examples, the first layer and the second layer can each include from about 5% to about 95% of a total thickness of the heat-shrinkable film. The first copolymerized polyester resin and the second copolymerized polyester resin can each include a diol component and a dicarboxylic acid component, and the diol component can include at least one of ethylene glycol, diethylene glycol, neopentyl glycol, cyclohexanedimethanol, or methyl propanediol.

In some instances, the first copolymerized polyester resin and the second copolymerized polyester resin can each include a functional glycol modification in which the diol component includes at least one of diethylene glycol, neopentyl glycol, cyclohexanedimethanol, or methyl propanediol. The first copolymerized polyester resin can include a total amount of the functional glycol modification from about 15 mole % to about 40 mole %, based on a total number of moles of the diol component. The second copolymerized polyester resin can include a total amount of the functional glycol modification from about 5 mole % to about 35 mole %, based on a total number of moles of the diol component. The first copolymerized polyester resin can include a first total amount of the functional glycol modification, the second copolymerized polyester resin can include a second total amount of the functional glycol modification, and the first total amount can be greater than the second total amount by at least 1 mole %, based on a total number of moles of the diol component.

In various implementations, the first copolymerized polyester resin and the second copolymerized polyester resin can be identical. At least one of the first layer or the second layer can include a blend of copolymerized polyester resins. The heat-shrinkable film can include a third layer disposed between the first layer and the second layer, a functional glycol modification of the first layer can be greater than a functional glycol modification of the third layer, and the functional glycol modification of the third layer can be greater than a functional glycol modification of the second layer. In some examples, the heat-shrinkable film can include a third layer including the first copolymerized polyester resin, the second layer can be disposed between the first layer and the third layer, and the third layer can be thinner than the first layer. The heat-shrinkable film can include a layer of ink disposed on or over the second layer. The heat-shrinkable film can include a primer layer disposed between the layer of ink and the second layer, the primer layer can be configured to dissolve in a caustic soda.

In another aspect, the subject matter of this disclosure relates to a shrink sleeve. The shrink sleeve includes: a heat-shrinkable film forming a tube shape and having: a first layer including a first copolymerized polyester resin; and a second layer disposed on the first layer and including a second copolymerized polyester resin; and a layer of ink disposed on or over the second layer, wherein a particle of the heat-shrinkable film is predisposed to either (i) curl towards the first layer when heat is applied or (ii) not curl towards the second layer when heat is applied.

In some examples, the layer of ink is on an inner surface of the tube shape. The shrink sleeve can be configured to shrink around a container when heat is applied by at least one of steam, hot-air, microwave energy, or infrared radiation. The first copolymerized polyester resin and the second copolymerized polyester resin can each include a diol component and a dicarboxylic acid component, and the diol component can include at least one of ethylene glycol, diethylene glycol, neopentyl glycol, cyclohexanedimethanol, or methyl propanediol.

In various instances, the first copolymerized polyester resin and the second copolymerized polyester resin can each include a functional glycol modification in which the diol component includes at least one of diethylene glycol, neopentyl glycol, cyclohexanedimethanol, or methyl propanediol. The first copolymerized polyester resin can include a total amount of the functional glycol modification from about 15 mole % to about 40 mole %, based on a total number of moles of the diol component. The second copolymerized polyester resin can include a total amount of the functional glycol modification from about 5 mole % to about 35 mole %, based on a total number of moles of the diol component. The first copolymerized polyester resin can have a first total amount of the functional glycol modification, the second copolymerized polyester resin can have a second total amount of the functional glycol modification, and the first total amount can be greater than the second total amount by at least 1 mole %, based on a total number of moles of the diol component.

In certain examples, the first copolymerized polyester resin and the second copolymerized polyester resin can be identical. At least one of the first layer or the second layer can include a blend of copolymerized polyester resins. The shrink sleeve can include a primer layer disposed between the layer of ink and the second layer, wherein the primer layer is configured to dissolve in a caustic soda.

In another aspect, the subject matter of this disclosure relates to a method of manufacturing a heat-shrinkable film. The method includes: coextruding a heat-shrinkable film including (i) a first layer including a first copolymerized polyester resin and (ii) a second layer disposed on the first layer and including a second copolymerized polyester resin, wherein the film is predisposed to either (i) curl towards the first layer when heat is applied or (ii) not curl towards the second layer when heat is applied.

In some examples, the heat-shrinkable film is coextruded at a temperature from about 200° C. to about 300° C. Coextruding the heat-shrinkable film can include casting the heat-shrinkable film through a die and onto a chill roll. The method can include stretching the heat-shrinkable film in a tenter frame to a stretch ratio from about 1.5 to about 7. The heat-shrinkable film can include a glass transition temperature, and the stretching can be performed at a temperature from about the glass transition temperature to the glass transition temperature plus about 20° C.

In another aspect, the subject matter of this disclosure relates to a method of recycling a heat-shrinkable film. The method includes: obtaining particles of a heat-shrinkable film including: a first layer including a first copolymerized polyester resin; and a second layer disposed on the first layer and including a second copolymerized polyester resin; and a layer of ink disposed on the second layer; and immersing the particles in a liquid bath, wherein the particles are predisposed to either (i) curl towards the first layer when heat is applied or (ii) not curl towards the second layer when heat is applied.

In certain implementations, the particles have a length from about 1 mm to about 50 mm. The liquid bath can have: a temperature from about 55° C. to about 95° C.; a caustic soda in an amount from about 0.1% to about 5%, by weight; and a detergent in an amount from about 0.1% to about 3%, by weight. The liquid bath can include an anti-foaming agent. The particles can be formed by crushing, chopping, and/or shredding the heat-shrinkable film. The particles of the heat-shrinkable film can include a primer layer disposed between the layer of ink and the second layer, and the primer layer can be configured to dissolve in a caustic soda.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, compositions, systems, and methods of the claimed invention encompass variations and adaptations developed using information from the embodiments described herein. Adaptation and/or modification of the apparatus, compositions, systems, and methods described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, a "functional glycol modification" as used herein can refer to a copolymerized polyester resin having a diol component and a dicarboxylic acid component, in which at least some percentage of the diol component is not ethylene glycol. For example, in a copolymerized polyester resin having a functional glycol modification, the diol component can include ethylene glycol in addition to diethylene glycol, neopentyl glycol, cyclohexanedimethanol, methyl propanediol (e.g., 2-Methyl-1,3-propanediol), or any combination thereof. An amount of "functional glycol modification" can be defined in terms of a percentage of the total moles of diol component present in the copolymerized polyester resin in which at least some percentage of the diol component is not ethylene glycol. For example, if 10 mole % of the diol component in a copolymerized polyester resin is not ethylene glycol, then the total amount of functional glycol modification for the resin can be 10 mole %.

In general, a heat-shrinkable film is a film that tends to shrink upon application of heat or when exposed to elevated temperatures (e.g., at or above a threshold value). Heat-shrinkable films can be used to form labels for a variety of containers, such as bottles, cap seals, or bundle packaging. For example, ink can be printed onto a heat-shrinkable film to generate images and/or text. The printed heat-shrinkable film can be formed into a tubular sleeve and placed over a container. When heat is applied, the sleeve can shrink to achieve a tight fit over the container. The container can be filled with a desired product (e.g., a beverage) and sold to consumers.

After use, the container and label can be subjected to a recycling process in which the container and label are crushed, chopped, and/or shredded into flakes or particles. The particles can be de-inked by exposing the particles to a hotwash process. This can involve, for example, immersing the particles in a warm liquid bath containing a caustic soda and a detergent. Upon exposure to the hotwash process, the particles of the heat-shrinkable film can shrink and/or curl.

Figure 1:
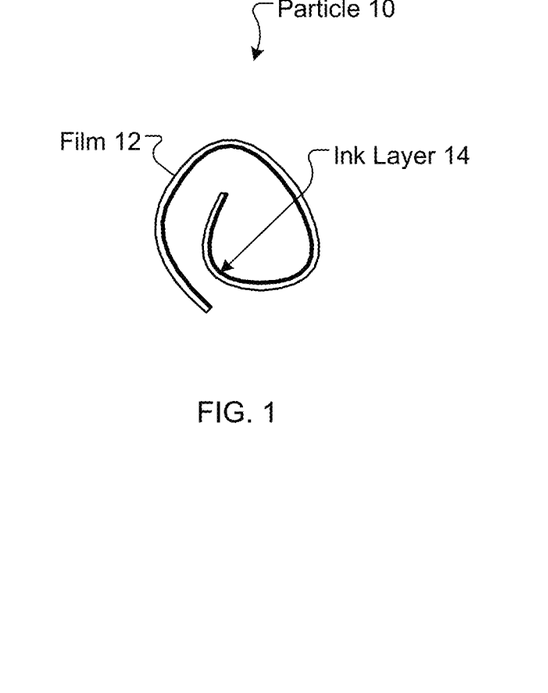
FIG. 1 is a schematic, cross-sectional view of a heat-shrinkable film particle curling towards an ink layer, in accordance with certain examples.

For example, referring to FIG. 1, a particle 10 of a previous heat-shrinkable film 12 and an ink layer 14 tends to curl towards the ink layer 14 during the hotwash process. This can encapsulate or trap the ink layer 14 within the curled film 12, such that it can be difficult or impossible to remove the ink layer 14 from the film 12. In such instances, the ink layer 14 can remain adhered to the film 12 in the particle 10, which can prevent the film 12 from being cleaned and/or recycled.

Figure 2:
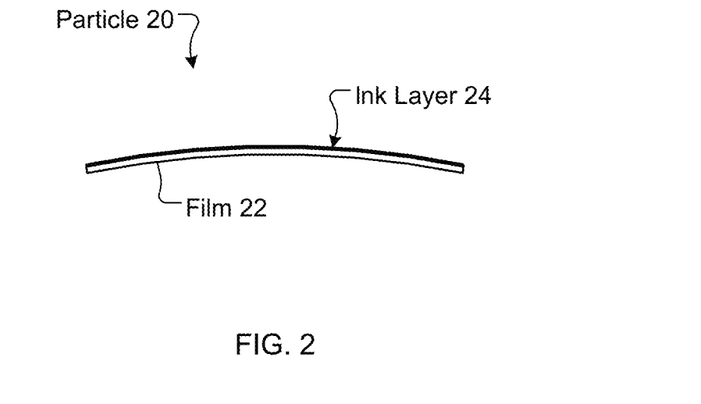
FIG. 2 is a schematic, cross-sectional view of a heat-shrinkable film particle curling away from an ink layer, in accordance with certain examples.

Advantageously, referring to FIG. 2, the systems, methods, and compositions described herein can avoid the undesirable curling and encapsulation of ink associated with previous heat-shrinkable films. For example, a particle 20 of a heat-shrinkable film 22 described herein can be predisposed to either (i) curl away from an ink layer 24 or (ii) not curl towards the ink layer 24, when exposed to a hotwash process. This can enable the ink layer 24 to be exposed and removed from the film 22 during the hotwash process, such that the film 22 can be cleaned, recycled, and used to form new films or other products.

Figure 3:
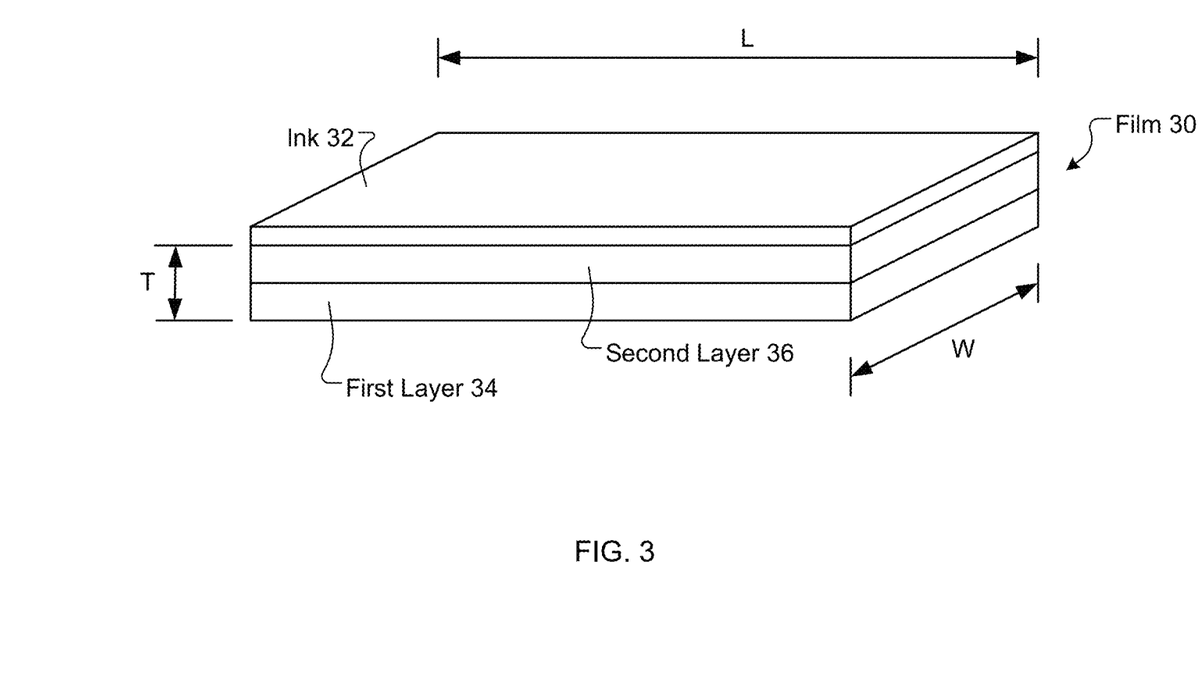
FIG. 3 is a schematic, perspective view of a heat-shrinkable film and a layer of ink, in accordance with certain examples.

FIG. 3 is a schematic, perspective view of a heat-shrinkable film 30 and an ink layer disposed on the heat-shrinkable film 30, in accordance with certain examples. The heat-shrinkable film 30 includes a first layer 34 bonded to a second layer 36, with the ink layer 32 disposed on or bonded to the second layer 36. In general, the first layer 34 and the second layer 36 are configured to have different shrinkage tendencies, such that when heat is applied to the film the two layers tend to shrink by different amounts and/or at different rates. For example, to prevent the film from curling towards the ink layer 32, the shrinkage tendency of the first layer 34 can be configured to be higher than the shrinkage tendency of the second layer 36.

The heat-shrinkable film 30 can be composed of or include a variety of heat-shrinkable materials, including, for example, polyester (e.g., a copolymerized polyester resin), polyethylene, polypropylene, styrene-butadiene-copolymer, polyvinyl chloride, and/or oriented polystyrene. In various examples, the first layer 34 and the second layer 36 each includes or is composed of a copolymerized polyester resin having a diol component and a dicarboxylic acid component. The copolymerized polyester resin can be formed by subjecting the diol component and the dicarboxylic acid component to a transesterification reaction followed by polymerization.

The diol component in the copolymerized polyester resin can be composed of or include, for example, ethylene glycol (EG), diethylene glycol (DEG), neopentyl glycol (NPG), cyclohexanedimethanol (CHDM), methyl propanediol (MP-DIOL, e.g., 2-Methyl-1,3-propanediol), or any combination thereof. Alternatively or additionally, in some examples, the diol component can be composed of or include 1,4-cyclohexanedimethanol, 1,3-propanediol, 2-butyl-2-ethyl-1,3-propanediol, 2,3-butanediol, 1,3-butanediol, 1,4-butanediol, 1,5-pentanediol, 2,2-diethyl-1,5-pentanediol, 2,4-diethyl-1,5-pentanediol, 3-methyl-1,5-pentanediol, 1,1-dimethyl-1,5-pentanediol, 1,2-octanediol, 1,3-octanediol, or any combination thereof.

In some instances, the dicarboxylic acid component in the copolymerized polyester resin can be composed of or include, for example, terephthalic acid, dimethylterephthalic acid, isophthalic acid, naphthalene dicarboxylic acid, orthophthalic acid, an aromatic dicarboxylic acid, adipic acid, azelaic acid, sebacic acid, decanedicarboxylic acid, an aliphatic dicarboxylic acid, an alicyclic dicarboxylic acid, an ester thereof, or any combination thereof.

Table 1 includes low, high, and typical values for various parameters associated with the heat-shrinkable film 30, in accordance with certain examples. Each listed value can be a minimum, maximum, or average value (e.g., in a range of values). Various embodiments include any parameter value (e.g., integer or decimal value) within the cited ranges. For example, an amount of ethylene glycol in the first layer 34 can be greater than, less than, or equal to 60, 61, 62, . . . , 85 (% of a total number of moles of diol component). Likewise, the amount of neopentyl glycol in the first layer 34 can be greater than, less than, or equal to 0, 1, 2, . . . , 30 (% of the total number of moles of diol component). Express support and written description of these values for each parameter are hereby represented.

TABLE 1

Exemplary parameters for the heat-shrinkable film 30.

| Parameter | First Layer 34 (higher shrink tendency) | | | Second Layer 36 (lower shrink tendency) | | |
| --- | --- | --- | --- | --- | --- | --- |
| | Low | High | Typical | Low | High | Typical |
| Diol component | | | | | | |
| EG (mole % of diol component) | 60 | 85 | 78 | 65 | 95 | 80 |
| DEG (mole % of diol component) | 0 | 15 | 5 | 0 | 15 | 5 |

TABLE 1-continued

Exemplary parameters for the heat-shrinkable film 30.

| Parameter | First Layer 34 (higher shrink tendency) | | | Second Layer 36 (lower shrink tendency) | | |
|---|---|---|---|---|---|---|
| | Low | High | Typical | Low | High | Typical |
| NPG (mole % of diol component) | 0 | 30 | 25 | 0 | 30 | 25 |
| CHDM (mole % of diol component) | 0 | 30 | 25 | 0 | 30 | 25 |
| MPDIOL (mole % of diol component) | 0 | 20 | 10 | 0 | 20 | 10 |
| Total functional glycol modification (e.g., by NPG, CHDM, and/or MPDIOL, mole % of diol component) | 15 | 40 | 22 | 5 | 35 | 20 |
| Total functional glycol modification minus the total functional glycol modification of the second layer 36 | 1 | 10 | 2 | N/A | N/A | N/A |
| Dicarboxylic acid component | | | | | | |
| Isophthalic acid (mole % of acid component) | 0 | 20 | 0 | 0 | 20 | 0 |
| Properties | | | | | | |
| Thickness (% of total film thickness T) | 5 | 95 | 50 | 5 | 95 | 50 |
| Glass transition temperature (° C.) | 70 | 90 | 75 | 70 | 90 | 75 |
| Shrinkage at 80° C. for 30 seconds in water bath (%) | 51 | 80 | 62 | 50 | 70 | 60 |
| Shrinkage at 80° C. for 30 seconds in water bath (%) minus shrinkage at 80° C. for 30 seconds in water bath (%) for the second layer 36 | 1 | 10 | 2 | N/A | N/A | N/A |

As table 1 indicates, an amount of functional glycol modification can be higher for the first layer 34 than for the second layer 36. In other words, the diol component in the first layer 34 can include less ethylene glycol and more neopentyl glycol, cyclohexanedimethanol, and/or methyl propanediol (or other glycol modifiers), compared to the second layer 36. A difference between the total amount of functional glycol modification in the first layer 34 and the total amount of functional glycol modification in the second layer 36 can be, for example, greater than about 1%, from about 1% to about 10%, from about 1% to about 5%, or from about 1% to about 2% (in % of total moles of diol component).

In some examples, the dicarboxylic acid component can be different for the first and second layers 34 and 36. For example, the first layer 34 can include a type of dicarboxylic acid component (e.g., isophthalic acid) that is not present in the second layer 36. Alternatively or additionally, the first layer 34 can include a different amount (e.g., 10 mole %) of the same dicarboxylic acid component (e.g., isophthalic acid), compared an amount present in the second layer 36 (e.g., 5 mole %), based on a total number of moles of the dicarboxylic acid component.

In certain examples, the compositional differences (e.g., in the diol component, the dicarboxylic acid component, and/or the total amount of functional glycol modification) between the first and second layers 34 and 36 can cause the first layer 34 to have a higher shrinkage tendency, compared to the second layer 36. Table 1 includes shrinkage values for the two layers when exposed to an 80° C. water bath for 30 seconds. The values indicate that a film formed entirely of the material in the first layer 34 may be expected to shrink by about 62%, while a film formed entirely of the material in the second layer 36 may be expected to shrink by about 60% (e.g., in a transverse direction or a machine direction). A difference between the shrinkage percentage for the first layer 34 and the shrinkage percentage for the second layer 36 can be, for example, from about 1% to about 20%, from about 1% to about 10%, from about 1% to about 5%, or from about 1% to about 2%.

In various examples, the differences in composition and properties for the two layers 34 and 36 (e.g., as presented in Table 1) can be achieved using different types of resins in the two layers 34 and 36 or by using different proportions (e.g., different weight percentages) of the same types of resins in the two layers 34 and 36. For example, the first layer 34 can include or be composed of a type of resin (e.g., a copolymerized polyester resin having a higher amount of functional glycol modification) that is not present in the second layer 36, and/or the second layer 36 can include or be composed of a type of resin (e.g., a copolymerized polyester resin having a lower amount of functional glycol modification) that is not present in the first layer 34.

Alternatively or additionally, the first layer 34 and the second layer 36 can each have a different amount (e.g., a different weight percentage) of the same resin (e.g., a copolymerized polyester resin having a functional glycol modification) blended with one or more other resins, which may be the same or different for the two layers 34 and 36. For example, the first layer 34 and the second layer 36 can each include or be composed of a first resin and a second resin, where the first resin is a copolymerized polyester resin having a functional glycol modification and the second resin is a copolymerized polyester resin having little or no functional glycol modification (e.g., the diol component in the second resin may be 100% ethylene glycol). To achieve a higher total amount of functional glycol modification in the first layer 34, the first layer 34 can have more of the first resin and/or less of the second resin, by weight, compared to the second layer 36.

Referring again to FIG. 3, the heat-shrinkable film can have a thickness T, a length L, and a width W. The thickness T can be, for example, from about 5 microns to about 100 microns. As indicated in Table 1, the first layer 34 and the second layer 36 can each occupy from about 5% to about 95%, or about 50%, of the total thickness T. In some examples, a ratio of a thickness of the first layer 34 to a thickness of the second layer 36 can be adjusted to achieve a desired shrink or curling behavior. For example, one of the layers can be made thinner to reduce an influence the layer has on an overall shrinkage tendency of the film. The length L and the width W can vary depending on a manufacturing process, a packaging process, and/or on how the film is being utilized. For example, a web of the heat-shrinkable film 30 in a manufacturing process can have a width W up to about 20 m, and the web can be slit into narrower ribbons having widths W as low as about 0.01 m. Alternatively, for particles of the heat-shrinkable film 30 in a recycling process, as described herein, the length L and/or width W (or diameter for circular particles) can be from about 1 mm to about 50 mm, or from about 3 mm to about 15 mm.

In various examples, the ink layer 32, the first layer 34, and/or the second layer 36 may be discontinuous and/or may cover different areas. For example, the ink layer 32 may be arranged as dots, stripes, or other discontinuous regions. One or more intermediate layers can be disposed between the first layer 34 and the second layer 36 or between the second layer 36 and the ink layer 32.

With one, two, or more layers included in the film, the desired asymmetric shrink behavior (e.g., not curling towards the ink layer) can be achieved by configuring top and bottom portions of the film to have different shrink tendencies and/or to exhibit different shrink forces when heat is applied. For example, a top portion (e.g., a top half) of the film closest to or in contact with the ink layer can have a lower shrink tendency (e.g., a lower shrink force) compared to a bottom portion (e.g., bottom half) of the film. The lower shrink tendency can be achieved using a lower functional glycol modification, as described herein. When the film includes more than two layers, for example, one or more layers closer to the ink layer (e.g., in the top half of the film) can have a lower functional glycol modification (e.g., on average), compared to the functional glycol modification of one or more layers further from the ink layer (e.g., in the bottom half of the film). In an example involving three layers, a bottom layer (e.g., the first layer 34) furthest from the ink layer can have a higher functional glycol modification (e.g., 3% higher) than a middle layer, which can have a higher functional glycol modification (e.g., 2% higher) than a top layer (e.g., the second layer 36) closest to or in contact with the ink layer (e.g., the ink layer 32).

Alternatively or additionally, the desired asymmetric shrink behavior can be achieved using layers with different thicknesses. In a film having three layers, for example, a bottom layer and a top layer can have the same composition (e.g., including a relatively high functional glycol modification), a middle layer can have a different composition (e.g., including a relatively low functional glycol modification), and the desired asymmetric shrink behavior can be achieved by making the top layer thin compared to the middle and bottom layers. In such a case, the thicker bottom layer can exert a greater shrink force or tension compared to the thin top layer, such that the film curls away from (or at least not towards) the top layer, which is closest to the ink layer. The top layer in this example can occupy less than 10% of a total film thickness. In this example, the bottom layer, the middle layer, and the top layer can alternatively be referred to as a first layer (e.g., the first layer 34), a second layer (e.g., the second layer 36), and a third layer, respectively.

Figure 4:
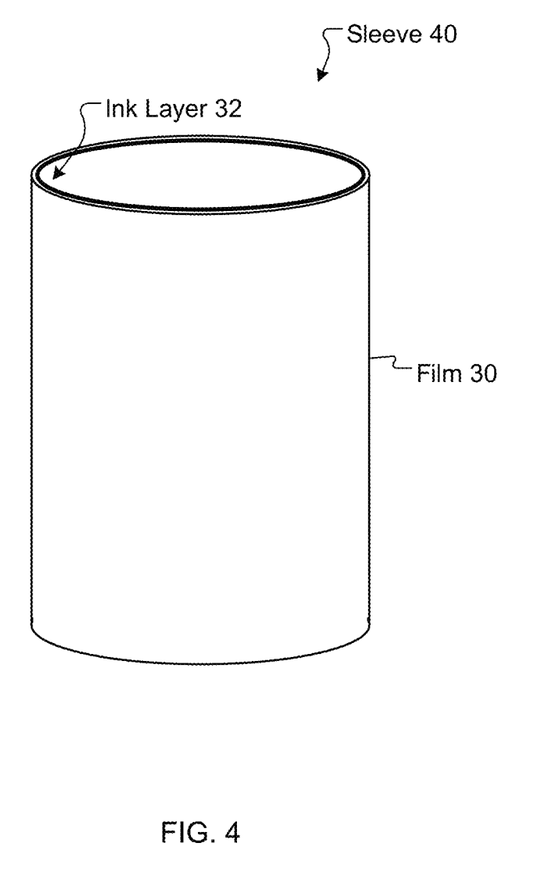
FIG. 4 is a schematic, perspective view of a shrink sleeve having an inner layer of ink, in accordance with certain examples.

Additionally or alternatively, the heat-shrinkable film 30 can have any shape and does not need to be flat and rectangular, as shown in FIG. 3. For example, referring to FIG. 4, the heat-shrinkable film 30 can be formed into a shrink sleeve 40 having a tubular shape. The shrink sleeve 40 can be placed over a bottle (or other container) and can shrink to form a tight fit around the bottle when heat is applied (e.g., using steam, hot-air, microwave energy, or infrared radiation). The ink layer 32 is on an inner surface of the sleeve 40 in the depicted example.

Figure 5:
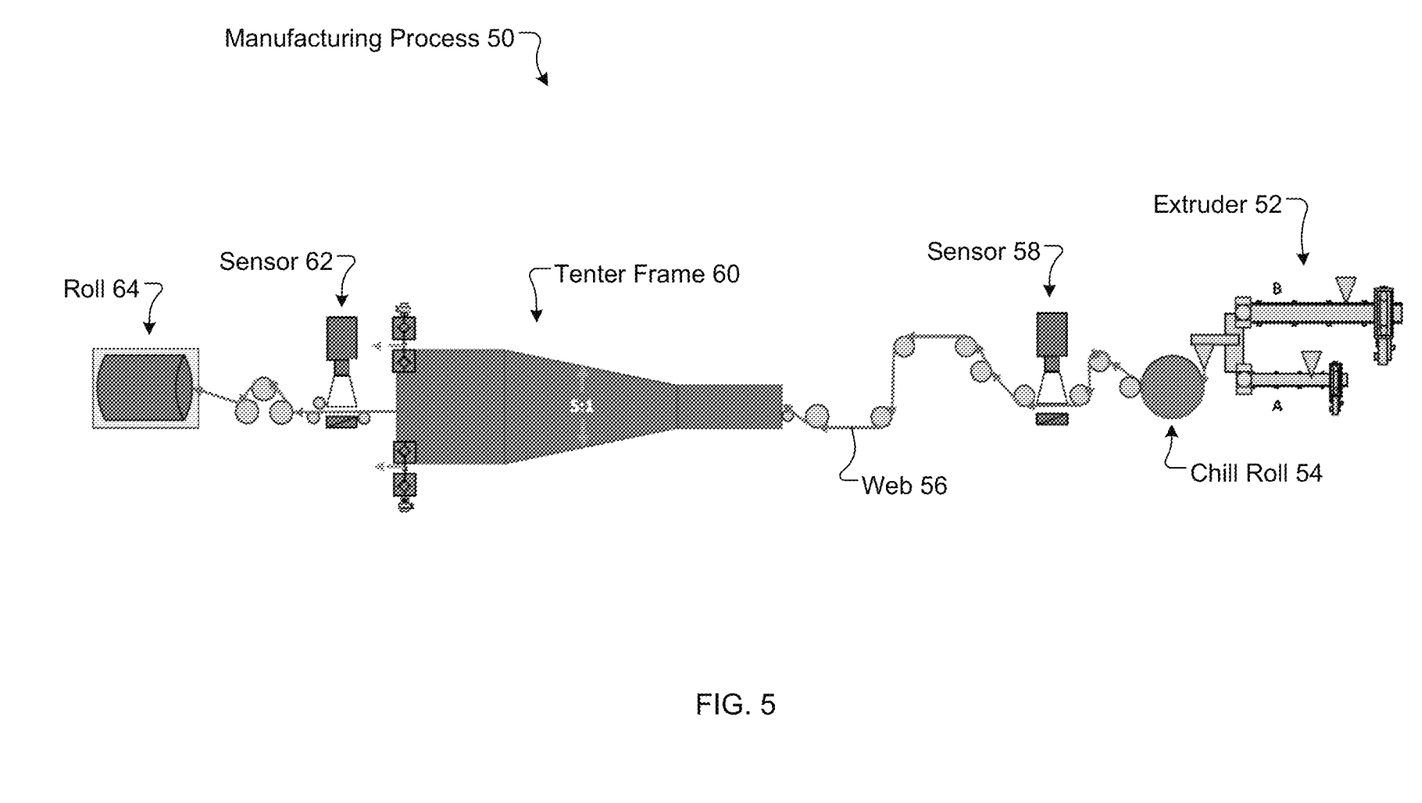
FIG. 5 is a schematic diagram of a process for manufacturing a heat-shrinkable film, in accordance with certain examples.

FIG. 5 is a schematic diagram of a manufacturing process 50 that can be used to manufacture heat-shrinkable films (e.g., the heat-shrinkable film 30), in accordance with certain examples. Extruders 52 can be used to coextrude two layers (e.g., the first layer 34 and the second layer 36) for a heat-shrinkable film. The two layers are cast onto a chill roll 54, which cools and solidifies the film. A web 56 of the film is inspected by one or more quality control sensors 58 and is delivered to a tenter frame 60. The tenter frame 60 can stretch the film to a stretch ratio from about 1.5 to about 7, or about 5, in a transverse direction (perpendicular to a machine direction). Additionally or alternatively, one or more downstream rollers can stretch the film in the machine direction by pulling the web at a faster speed, compared to a speed of an upstream roller. The stretching can be performed at or above a glass transition temperature $T_g$ of the heat-shrinkable film. For example, the stretching can be performed at a temperature from about $T_g$ to about $T_g+20°$ C. One or more quality control sensors 62 can inspect the stretched film, which can be wound up to form a roll 64.

In subsequent steps (not shown), the heat-shrinkable film can be unwound from the roll 64 and passed through a printing process that applies ink (e.g., the ink layer 32) to the heat-shrinkable film. In some examples, one or more intermediate layers can be applied between the heat-shrinkable film and the ink. For example, a primer that can be dissolved or stripped by a caustic soda can be applied to the heat-shrinkable film before the ink is applied. The primer can facilitate removal of the ink during a subsequent hotwash process, as described herein. Additionally or alternatively, the heat-shrinkable film can be formed into a tubular shape (e.g., to form the sleeve 40) and/or cut to desired sizes.

Figure 6:
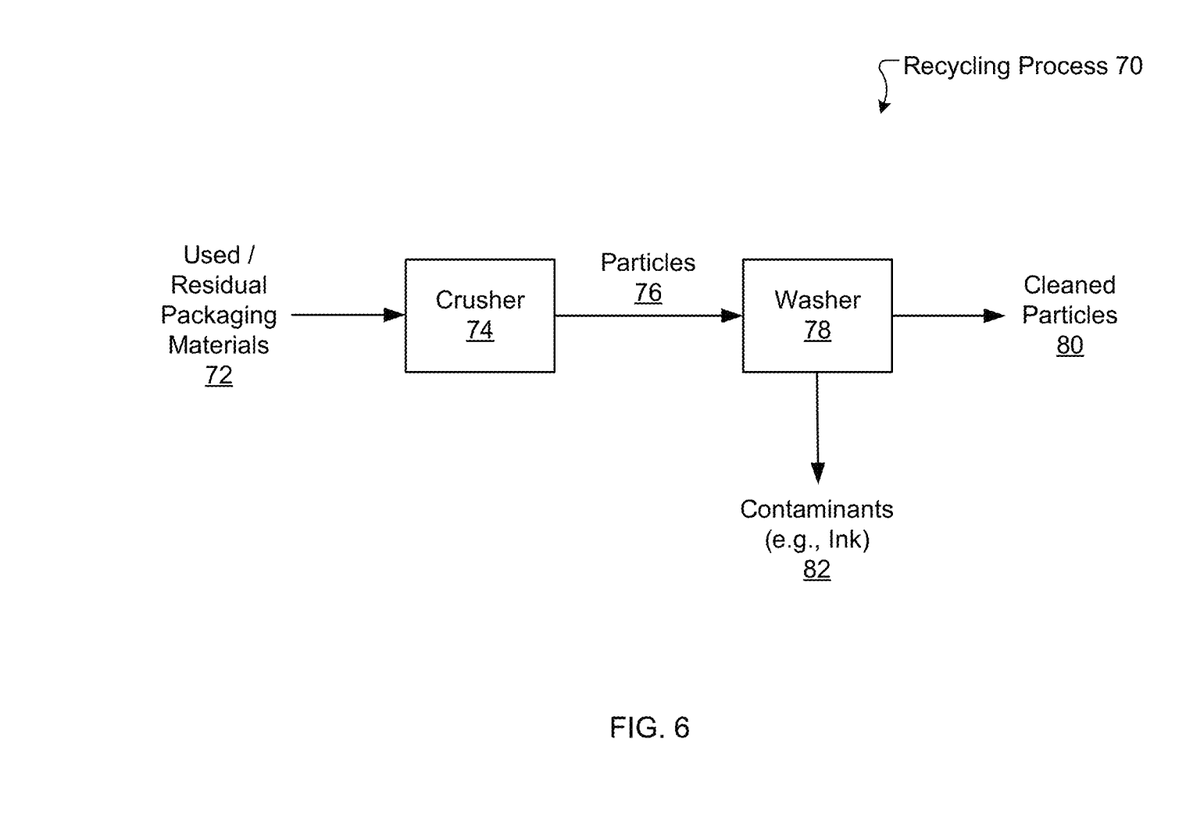
FIG. 6 is a schematic diagram of a process for recycling a heat-shrinkable film, in accordance with certain examples.

FIG. 6 is a schematic diagram of a recycling process 70 that can be used to recycle heat-shrinkable films (e.g., the heat-shrinkable film 30). The process 70 can begin by obtaining used or residual packaging materials 72, including heat-shrinkable films and other recyclable materials, such as polymeric containers, bottles, and bottle caps. The residual packaging materials 72 are provided to a crusher 74, which can crush, chop, and/or shred the packaging materials 72 to obtain particles 76 of those materials. In various examples, the particles 76 can include particles of a heat-shrinkable film covered with a layer of ink (e.g., the ink layer 32).

The particles 76 are provided to a washer 78, which can clean the particles 76 using a hotwash process in which the particles 76 are immersed, mixed, and/or scrubbed in a warm liquid bath. The liquid bath can include water, a caustic soda (e.g., in an amount from about 0.1% to about 5%, by weight), a detergent (e.g., in an amount from about 0.1% to about 3%, by weight), and other ingredients (e.g., a defoamer or anti-foaming agent). The liquid bath can have a temperature from about 55° C. to about 95° C., or about 85° C. Exposing the particles 76 to the liquid bath can cause particles of heat-shrinkable materials to shrink and/or curl.

Advantageously, contrary to previous heat-shrinkable film materials, particles of the heat-shrinkable films described herein (e.g., heat-shrinkable film 30) tend to curl away from the ink layer or at least not curl towards the ink layer, such that the ink is exposed to the hotwash process and can be scrubbed or removed from the particles, rather than being trapped within curled particles. The washer 78 can have a mixing device (e.g., a rotary blade operating at 500 rpm) to mix or stir the particles 76 in the liquid bath. Outputs from the washer 78 can include cleaned particles 80 of heat-shrinkable films (e.g., having little or no ink) and a stream of ink, dirt, or other contaminants 82. The cleaned particles 80 can be used to form recycled products, such as new heat-shrinkable films, containers, etc.

As discussed above (e.g., with respect to FIG. 1), previous heat-shrinkable films (e.g., heat-shrinkable film 12) can tend to curl towards an ink layer during a hotwash process. While the reasons for this curling tendency may not be well-understood, it is believed to be introduced when a shrink sleeve is applied to a bottle or other container (e.g., during a first shrink process). For example, when a previous heat-shrinkable film is manufactured (with or without an ink layer) and not formed into a shrink sleeve or applied to a container, the previous heat-shrinkable film or particles thereof may have no curling predisposition. In other words, such a film may have no preference to curl towards either side of the film (e.g., towards the ink or away from the ink) during the hotwash process. After the film has been formed into a shrink sleeve and applied to a container, however, the film (or particles thereof) can have a predisposition to curl towards a side corresponding to an inside of the shrink sleeve (a container side), which is where the ink is typically located. For example, it is presently discovered that after a shrink sleeve has been applied to a container (e.g., in a first shrink, typically at 80-85° C. for 5-10 seconds of heat exposure), the film or particles thereof can acquire a new predisposition that causes the film (or particles thereof) to curl towards the container side during the hotwash process. This curling predisposition may be a result of temperature differences between the outside of the film (e.g., in direct contact with heat energy) and the inside of the film (e.g., not in direct contact with heat energy and/or in contact with a relatively cool container) that occurred when the sleeve was applied to the container. In some examples, shrink temperature and/or shrink time during the sleeve application process can be varied in an effort to influence the curling predisposition or an intensity or likelihood thereof.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. For numerical ranges recited herein, various embodiments include any parameter value (e.g., integer or decimal value) within the cited ranges. For example, if a recited range is from 1 to 10, a value for the respective parameter can be greater than, less than, or equal to 1, 2, 3, . . . 9, or 10. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A heat-shrinkable film comprising:
   a shrink sleeve with an ink layer on an inner surface and configured to shrink and form a tight fit over a container when heated, the shrink sleeve comprising:
      a first outer layer comprising a first copolymerized polyester resin with a first functional glycol modification;
      a second inner layer disposed on the first outer layer and comprising a second copolymerized polyester resin comprising an amount of a second functional glycol modification that is less than an amount of the first functional glycol modification; and
      the ink layer is disposed on the second inner layer opposite the first outer layer,
   wherein a difference between the amount of the first functional glycol modification and the amount of the second functional glycol modification is between about 1 mole % and about 10 mole %, a difference between a shrinkage percentage for the first outer layer and a shrinkage percentage for the second inner layer of particles of the heat-shrinkable film resulting from crushing, chopping, and/or shredding of the heat-shrinkable film is between about 1% and about 5%, and the particles are predisposed to either (i) curl towards the first outer layer or (ii) not curl towards the second inner layer when heat is applied in a hotwash process comprising a liquid bath at a temperature between about 55° C. and about 95° C.

2. The heat-shrinkable film of claim 1, wherein the first copolymerized polyester resin and the second copolymerized polyester resin each comprise a diol component and a dicarboxylic acid component, and wherein the diol component comprises at least one of ethylene glycol, diethylene glycol, neopentyl glycol, cyclohexanedimethanol, or methyl propanediol.

3. The heat-shrinkable film of claim 2, wherein the first functional glycol modification and the second functional glycol modification each comprises at least one of diethylene glycol, neopentyl glycol, cyclohexanedimethanol, or methyl propanediol.

4. The heat-shrinkable film of claim 1, wherein at least one of the first outer layer or the second inner layer comprises a blend of copolymerized polyester resins.

5. The heat-shrinkable film of claim 1, further comprising a third layer disposed between the first outer layer and the second inner layer, wherein the amount of the first functional glycol modification of the first outer layer is greater than an amount of a functional glycol modification of the third layer, and wherein the amount of the functional glycol modification of the third layer is greater than the amount of the second functional glycol modification of the second inner layer.

6. The heat-shrinkable film of claim 1, further comprising a third layer comprising the first copolymerized polyester resin, wherein the second inner layer is disposed between the first outer layer and the third layer, and wherein the third layer is thinner than the first outer layer.

7. The heat-shrinkable film of claim 1, further comprising a primer layer disposed between the ink layer and the second inner layer, wherein the primer layer is configured to dissolve in a caustic soda.

8. A shrink sleeve comprising:
   a heat-shrinkable film forming a tube shape configured to shrink and form a tight fit over a container when heated and comprising:
      a first outer layer comprising a first copolymerized polyester resin with a first functional glycol modification; and
      a second inner layer disposed on the first outer layer and comprising a second copolymerized polyester resin comprising an amount of a second functional glycol modification that is less than an amount of the first functional glycol modification; and
   a layer of ink disposed on the second inner layer opposite the first outer layer,
      wherein a thickness of the second inner layer is less than 10% of a total thickness of the heat-shrinkable film, a difference between the amount of the first functional glycol modification and the amount of the second functional glycol modification is between about 1 mole % and about 10 mole %, a difference between a shrinkage percentage for the first outer layer and a shrinkage percentage for the second inner layer of a particle of the heat-shrinkable film resulting from crushing, chopping, and/or shredding of the heat-shrinkable film is between about 1% and about 5%, and the particle is predisposed to either (i) curl towards the first outer layer when heat is applied or (ii) not curl towards the second inner layer when heat is applied during a hotwash process comprising a liquid bath at a temperature between about 55° C. and about 95° C. and containing a caustic soda and a detergent.

9. The shrink sleeve of claim 8, wherein the shrink sleeve is configured to shrink around a container when heat is applied by at least one of steam, hot-air, microwave energy, or infrared radiation.

10. The shrink sleeve of claim 8, wherein the first copolymerized polyester resin and the second copolymerized polyester resin each comprises a diol component and a dicarboxylic acid component, and wherein the diol component comprises at least one of ethylene glycol, diethylene glycol, neopentyl glycol, cyclohexanedimethanol, or methyl propanediol.

11. The shrink sleeve of claim 10, wherein the first copolymerized polyester resin comprises a total amount of the functional glycol modification from about 15 mole % to about 40 mole %, based on a total number of moles of the diol component.

12. The shrink sleeve of claim 10, wherein the second copolymerized polyester resin comprises a total amount of the functional glycol modification from about 5 mole % to about 35 mole %, based on a total number of moles of the diol component.

13. The shrink sleeve of claim 10, wherein the first copolymerized polyester resin comprises a first total amount of the functional glycol modification, wherein the second copolymerized polyester resin comprises a second total amount of the functional glycol modification, and wherein the first total amount is greater than the second total amount by at least 1 mole % up to 10 mole %, based on a total number of moles of the diol component.

14. The shrink sleeve of claim 8, wherein at least one of the first outer layer or the second inner layer comprises a blend of copolymerized polyester resins.

* * * * *